Dec. 27, 1938.　　　R. COVER　　　2,141,346

CUTTER HEAD FOR CORN CUTTING MACHINES

Filed March 3, 1936　　　5 Sheets-Sheet 1

Inventor

Ralph Cover

By Mason & Porter

Attorneys

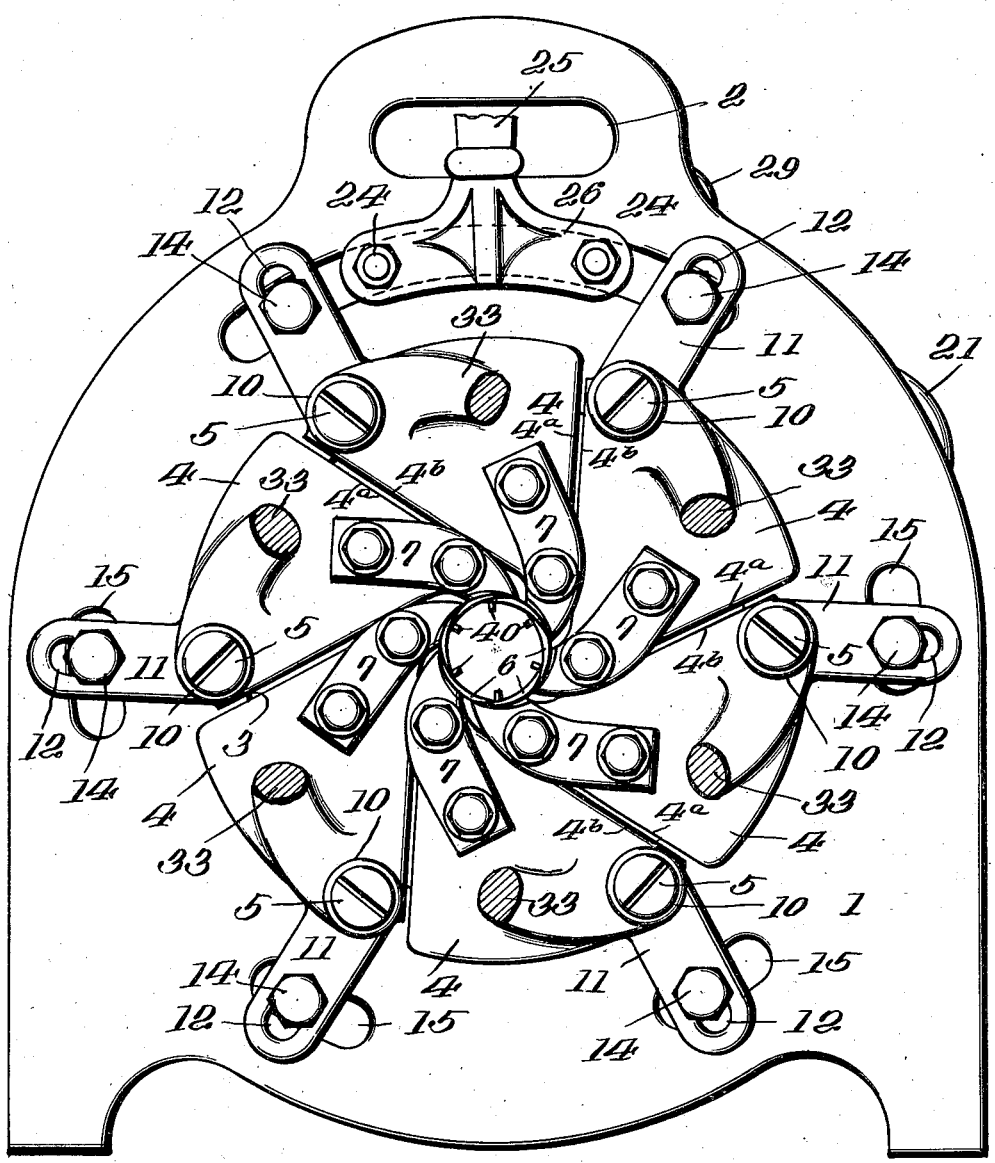

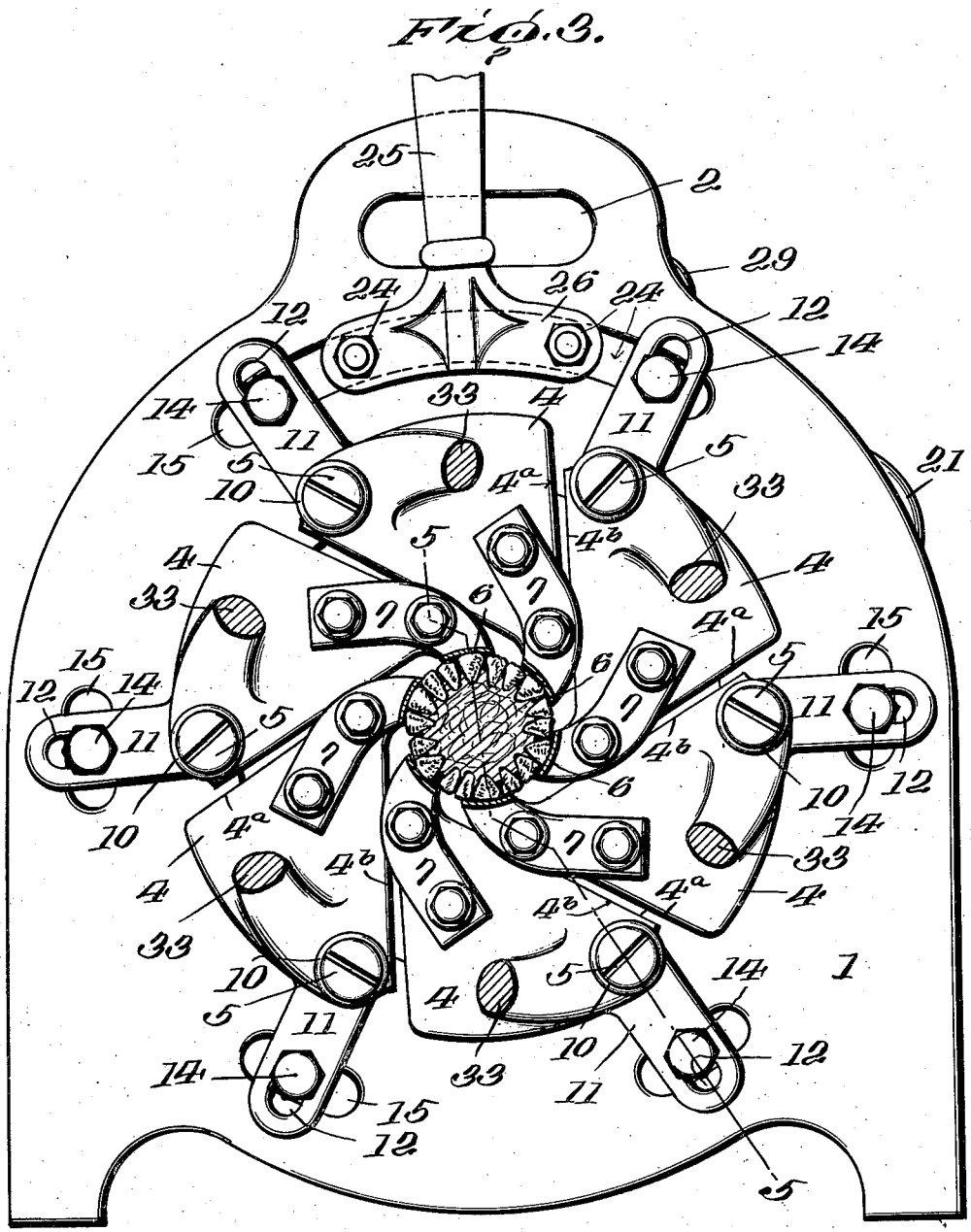

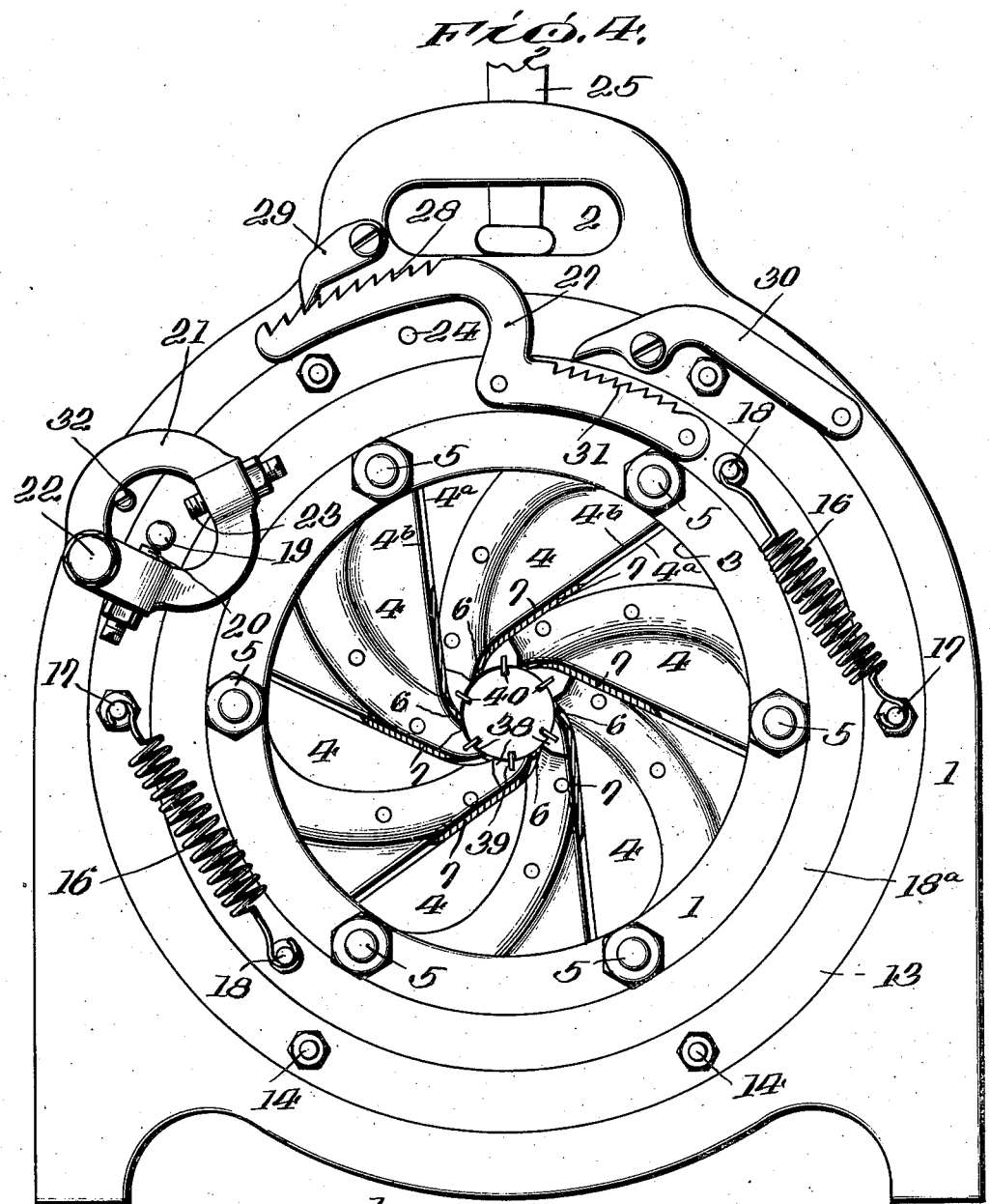

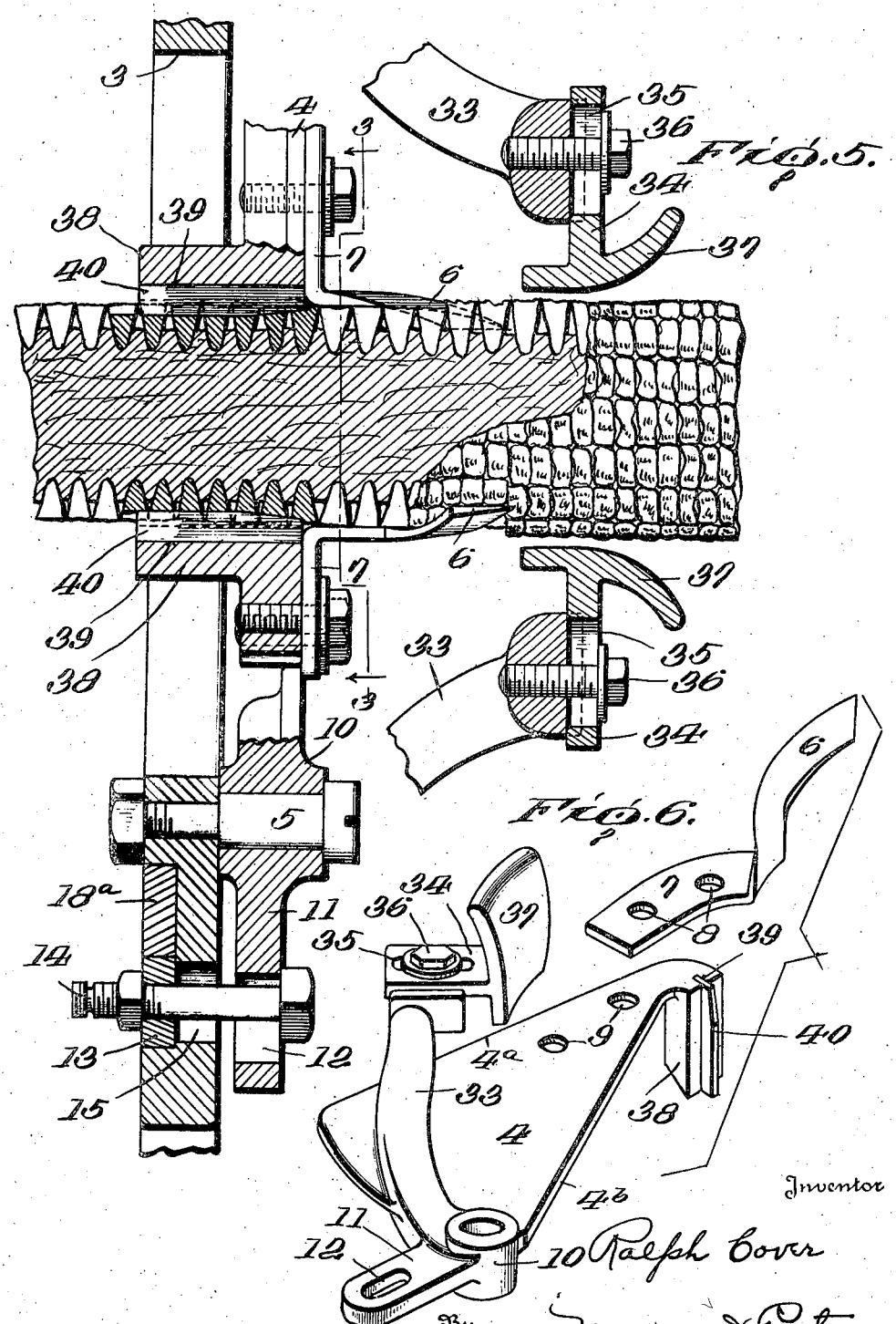

Patented Dec. 27, 1938

2,141,346

UNITED STATES PATENT OFFICE 2,141,346

CUTTER HEAD FOR CORN CUTTING MACHINES

Ralph Cover, Westminster, Md.

Application March 3, 1936, Serial No. 66,936

6 Claims. (Cl. 130—9)

The invention relates to new and useful improvements in a cutter head for removing the kernels of green corn from the cob.

An object of the invention is to provide a cutter head having non-rotating cutting blades with means contacting with the kernel stumps in rear of the blades for positioning said blades in conformity to the hardness of the material forming the stumps.

A further object of the invention is to provide a cutter head of the above type with depth gauges bearing on the kernels in advance of the cutting blades for positioning said blades for the initial cutting of the kernels and with auxiliary depth gauges bearing on the kernel stumps in rear of said cutting blades for thereafter determining the depth of the cutting of the hard kernels.

A still further object of the invention is to provide a cutter head of the above type wherein the lever arms supporting the blades severing the kernels are provided with extensions lying in the same plane and substantially closing the opening through the cutter head supporting plate in the region outside of the operation of the cutting blades.

A still further object of the invention is to provide a cutter head having lever arms supporting cutting blades, and spring-controlled means for simultaneously moving said lever arms to contracted position, and manual means for moving the lever arms to open position, with a shiftable stop for limiting the opening movement of the lever arms, which shiftable stop can be readily moved to inoperative position so as to permit a further opening movement of the lever arms.

These and other objects will in part be obvious and will in part be hereinafter more fully disclosed.

In the drawings which show by way of illustration one embodiment of the invention—

Fig. 2 is a view from the front showing the front gauge supporting arms in section and the gauges removed for the sake of clearness;

Fig. 3 is a sectional view on the line 3—3 of Fig. 5;

Fig. 4 is a rear view of the cutter head with the cutting blades in their closed position;

Fig. 5 is a sectional view on an enlarged scale, taken on the line 5—5 of Fig. 3, and showing diagrammatically the operation of the cutter head on an ear of old corn;

Fig. 6 is a view in perspective showing one of the lever arms and the parts associated therewith and carried thereby, the cutter blade being removed and spaced away from the lever arm, and Fig. 7 is a detail showing the stops for the shifting ring moved to an inoperative position.

Figure 1:
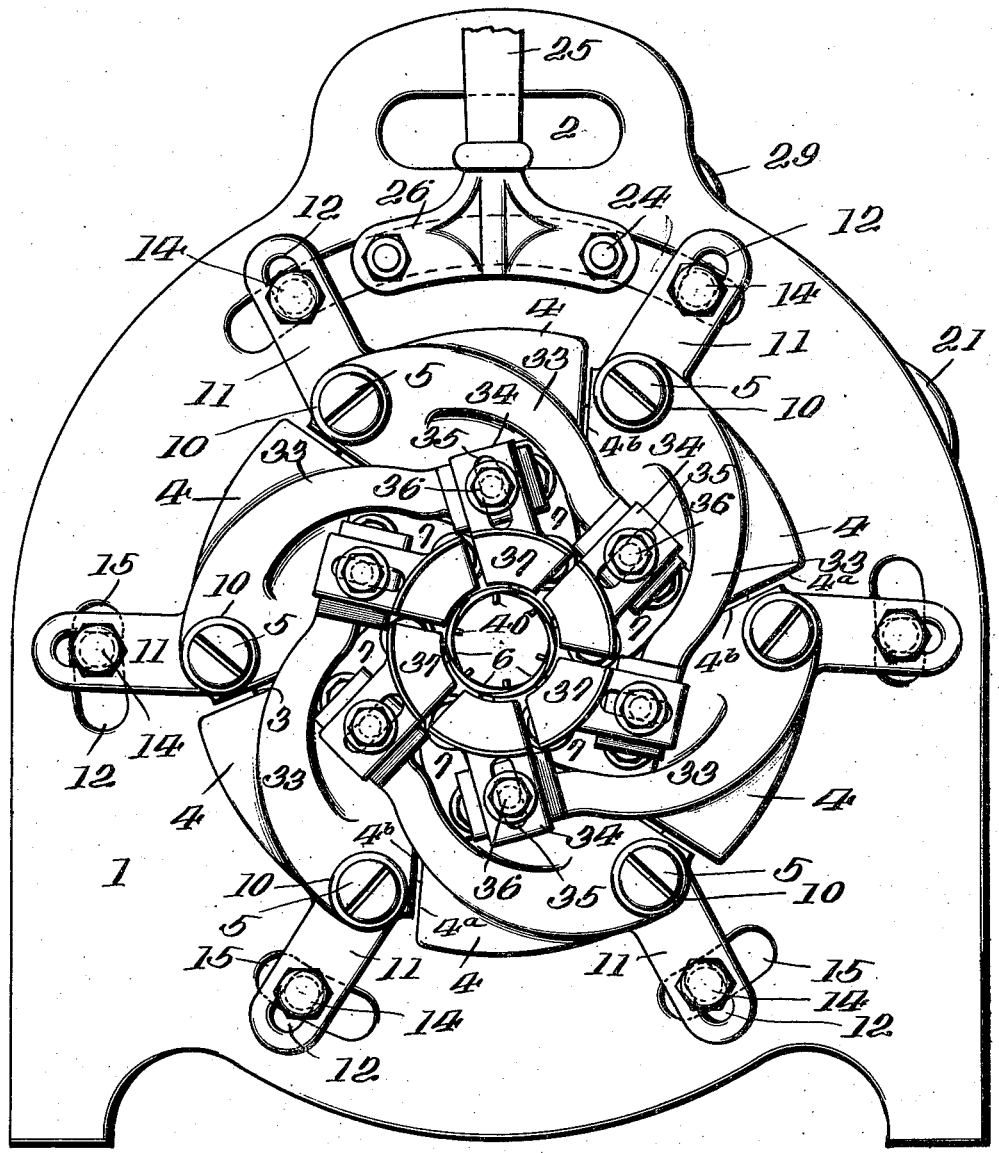
Figure 1 is a front view of a cutter head embodying the improvements.

The cutter head embodying my invention includes an upright head plate 1 which is adapted to be removably secured to the frame of the corn cutting machine in which it is to be used. There is a handhold 2 provided to facilitate the removing of the cutter head supporting plate from the machine. All of the parts of the cutting head are mounted on this supporting plate. The supporting plate is provided with a central opening 3 therethrough serving as a feed passage for the ears. Mounted on the front of the supporting head plate 1 are six lever arms, each of which is indicated at 4. These lever arms and the parts carried thereby are all of a similar construction, and a description of one will answer for the others. Each lever arm is mounted on a pivot stud 5 which is fixed to the head plate 1. This stud is located in the plate adjacent the edge of the opening 3 through the plate. Each lever arm is extended laterally in the region inside of the pivot stud 5 so as to close up the opening 3 through the head plate in the region outside of the cutting blades. Mounted on each lever arm is a cutting blade 6. Each cutting blade is provided with a shank portion 7 having holes 8, 8 therethrough, and clamping bolts passing through these holes 8, 8 and similarly spaced holes 9, 9 in the lever arm 4 rigidly support the cutting blade on the lever arm. The cutting blades are long and narrow and extend spirally about the ear with the advanced side thereof formed into a sharp cutting edge. These cutting blades are of sufficient length so that the free end of one cutting blade overlies the heel portion of the adjacent cutting blade when the cutter head is expanded to receive the largest ear. While cutting blades of the shape illustrated are preferred, it will be understood that from certain aspects of the invention the cutting blades may be otherwise shaped. These cutting blades are arranged about the opening 3 and are substantially concentric to an axial line along which the axes of the ears are fed so that the cutting blades will cut all of the kernels from the ear as it passes through the cutting head without any relative rotation of the cutting blades or ears.

Each lever arm 4 is provided with a hub 10 through which the pivot stud 5 passes. The lever arm is extended beyond the hub as indicated at 11, and is provided with a slot 12 extending radially of the cutter head. On the rear side of the head plate 1 there is a channel in which a ring 13 is guided, and this ring 13 carries a series of bolts 14, one for each lever arm. The head plate 1 is slotted at 15 in the region of each lever arm extension 11, and the bolt 14 extends through said slot and also through the slot 12. Thus it is that all of the lever arms are connected to this ring, and the movement of one lever arm is imparted to the others, and also the movement of the ring 13 will simultaneously move all of the lever arms. The bolt 14 can slide in the slot 12 and this gives freedom of movement to the lever arms on their pivot studs 5.

Springs 16, 16 are attached, respectively, to studs 17, 17 on the ring 13, and to studs 18, 18 on a tension plate 18a carried by the head plate. These springs tend to rotate the ring in a counter-clockwise direction as viewed in Fig. 4, and this will turn the lever arms 4 so as to move the blades toward the center line of the cutting head. The blades are limited in their inward movement through the contact of the stud 19 mounted on the ring 13 with the adjustable stop 20. This adjustable stop 20 is carried by a supporting member 21, which supporting member, in turn, is mounted on a pivot stud 22. Also mounted on this supporting member 21 is a stop 23 which limits the movement of the ring 13 in a clockwise direction, or the opening movement of the lever arms.

There is a long arcuate slot 24 through which the bolts 14 controlling the uppermost lever arms pass, and a hand lever 25 is provided with a shank portion 26 located in this slot 24, and the shank is rigidly attached to the ring 13. Through this hand lever the ring may be shifted when it is desired to manually move the cutting blades to their maximum open position for cutting. The stop 23 limits this movement of the ring 13. This provides a very quick and easy means of opening the cutter head to relieve any jam therein.

The tension plate 18a is mounted so that it may be moved about the center of the cutter head. Fixed to this tension plate 18a is a bracket arm 27. The bracket arm is provided with a series of teeth 28 and the dog 29 carried by the head plate is adapted to engage the teeth 28 on the bracket arm. This dog prevents the tension plate 18a from turning in a clockwise direction, and by shifting said plate in a counterclockwise direction and causing the dog 29 to engage another tooth on the bracket arm, the tension plate can thus be shifted to different set positions and the tension of the springs 16, 16 varied. It is always desirable to maintain a relatively light spring pressure of the cutting blades against the ear, and just the desired pressure may be obtained by the shifting of this tension ring. A locking dog 30 pivoted to the ring 13 may be moved so as to engage the teeth 31 of the bracket arm 27 for holding the lever arms in an open position.

The support 21 carrying the stops 20 and 23 is readily shiftable on its pivot stud 22. As shown in Fig. 4 of the drawings, it is moved to a position so that the outer portion of the supporting member 21 bears against a stop screw 32. This is in normal position so that the stops 20 and 23 will contact with the stud 19 and limit the movement of the ring 13 in its movement in either direction. If, however, the support 21 be turned on its pivot stud in a counterclockwise direction, as shown in Figure 7, then the ring 13 may be moved manually so as to position the lever arms 4 in an extreme open position to facilitate assembling or disassembling the parts, and the cleaning of the cutter head.

Each lever arm 4 is provided with a depth gauge having a shank portion 34 provided with a slot 35 through which a clamping bolt 36 extends for adjustably securing the depth gauge to the arm 33. Each depth gauge has a curved ear engaging portion 37 which is curved laterally to conform to the normal ear, and which is curved longitudinally outwardly toward the forward end thereof so as to provide a funnel-shaped passage for receiving and directing the ear through the cutter head. These depth gauges rest on the kernels in advance of the cutting blades. As the ear enters the depth gauges, it will move the same outward away from the center line of the cutter head. The springs 16, 16 will cause the depth gauges to yieldingly bear against the ear. As the depth gauges move outward, they cause the cutting blades also to move outward, as the arm 33 is a rigid part of the lever arm 4. Thus it is that the cutting blades are positioned for cutting the kernels to a given depth.

In the producing of whole grain corn, I have found that the quality can be greatly improved by positioning the cutting blades for a very shallow cut on old ears where the kernels are hard and starchy, so that only the tip ends are removed. This, of course, cannot be accomplished by the depth gauges operating on the kernels in advance of the cutting blades, for the reason that the cutting blades during their operation have a fixed relation to these depth gauges and will sever the kernels of the old ear at a fixed depth of cut, regardless of the condition of the kernel. Efforts have been made to position the cutting blades by gauges bearing on the cob. Such gauging devices could not be utilized for varying the depth of the cut in conformity to the hardness of the kernel being cut. In other words, the kernels will be cut a fixed distance above the cob.

One of the purposes of the present invention is to provide the gauging devices for the blades which are so constructed and positioned that they will ride on the stumps of the cut kernels, and when the kernels are hard, these gauging devices will only penetrate the stumps to an extent determined by the degree of hardness of the kernel stumps. In the present illustrated embodiment of the invention, each lever arm has an extension 38 substantially in alinement with the shank 7 of the cutting blade. This extension 38 passes through the opening in the head plate 1 to the rear side thereof. Each extension is provided with a slot 39 in which is rigidly mounted an auxiliary gauge 40. This gauge is relatively long and thin and provided with a blunt edge. In practice, the gauge is preferably from an inch to an inch and a half in length, and has a radial depth of one-eighth of an inch. The advance end of each gauging device lies in a line at right angles to the path of feed. The inner blunt edge of the gauging device inclines gradually from the front end inwardly toward the line of feed or axial line of the cutter head. As the kernel stumps approach these auxiliary gauging devices, these inclined ends will ride up on to the stumps and the gauges will sink into the stumps to a degree determined by the hardness and starch condition of the kernels. This is due to the fact that the gauges are of a length so that they contact with a plurality of stumps, and they are blunt so that they do not cut through the stump to the cob, but will only sink into the hard kernels to a depth determined by the condition of the kernel. The auxiliary gauging devices are rigidly supported by the lever arms 4 which carry the cutting blades, and when they are forced outwardly by the hard kernel stumps, they will shift the cutting blades outwardly and become the controlling gauges for determining the depth of cut. If, however, the ear is young and the kernels are soft, then the auxiliary gauges will sink into the cob and the kernels will be cut close to the cob.

In Figure 5 of the drawings, there has been illustrated diagrammatically and on an exaggerated scale, an ear of old corn wherein the kernels are hard and starchy, and the auxiliary gauges 40 are shown as having penetrated only a slight distance into the stumps of the cut kernels, thus lifting the cutting blades so that the tops only of the kernels are cut. It will be noted that the gauges 37 have been moved outward so that they are practically free from contact with the ear, and it is the auxiliary gauges 40 that serve as the depth gauge alone for positioning the cutting blades for the cutting of the kernels of the old corn.

From the above, it will be noted that a cutter head has been provided which is particularly well adapted for the cutting of the kernels for the whole grain pack. On the young corn, the positioning of the blades is determined entirely by the gauges in front of the blades, and the whole kernel is cut close to the cob on the real tender ear. On the old corn, the blades do not cut near the cob, but are positioned so as to cut off the tops of the kernels only, and this is accomplished by the gauging devices 40 bearing on the stumps of the cut kernels. Incidentally the auxiliary gauging devices hold the ear from turning under the cutting force of the cutting blades on the kernels. They extend radially of the ear and longitudinally of the ear and perform no scraping action so that the stumps of the hard kernels remain intact on the cob and are passed from the cutter head with the cob.

As noted above, each lever arm 4 is extended so as to close up the opening through the head plate in the region outside of the cutting blades. The edge 4a of one lever arm is close to the edge 4b of the adjacent lever arm. These edges are substantially parallel, as shown in Fig. 3, where the head is open to receive an ear, and they are also substantially parallel when the head is in closed position, as shown in Figures 4 and 5. Thus it is that the opening through the cutter head in the region outside of the blades is substantially closed and this is accomplished without any overlapping of the parts. While the parallel edges are sufficiently close together at all times to prevent the corn from passing between the extensions, still they do not touch, and therefore, free movement of the cutting blades is permitted. This presents a very smooth surface against which the cut portions of the kernels contact as they are cut from the cob, and no kernels pass between the extensions; neither are the kernel portions in any way mashed, as occurs where the shields or extensions are in overlapped relation.

The cutting blades, as noted, are attached to the lever arm 4 by bolts passing through openings 8, 8 in the shank of the blade and openings in the lever arms. The openings in the lever arms are preferably threaded to receive these bolts, and the openings in the shank are of larger diameter than the diameter of the clamping bolts, so that by loosening the bolts the blades may be adjusted. Inasmuch as the holes are of larger diameter, the shank carrying the cutting blade can be shifted to a limited extent in any direction in a plane at right angles to the pivotal axis of the lever arm for shifting the position of the free end and heel of the cutting blade relative to the center opening in the head plate for a given set position of the lever arm. The adjustment that may be accomplished by loosening these clamping bolts, is one wherein the axial line of the spiral cutting edge can be shifted relative to the center line of feed through the cutter head for a given position of the cutting blade supporting lever.

The auxiliary gauging devices are illustrated and described as relatively long and thin. It is to be understood, however, that these gauges may be otherwise shaped so long as they sink into the hard kernel stumps an extent determined by the hardness or condition of the kernel material.

In the drawings there is also shown an auxiliary gauging device 40 associated with each cutting blade. It is to be understood that it is not necessary to use a gauging device in connection with each cutting blade, as all of the cutting blades are connected so that the shifting of one blade alone to a set position will likewise similarly shift all other blades. It is also to be understood that many changes in the details of construction and the arrangement of the parts may be made without departing from the spirit of the invention as set forth in the appended claims.

Having thus described the invention, what I claim as new and desire to secure by Letters Patent, is:

1. A cutter head for corn comprising a stationary supporting head plate having an opening therethrough, a plurality of cutting blades independently mounted on said head plate and arranged about the opening and concentric to an axial line along which the axes of the ears are fed, spring means for moving said cutting blades inwardly, gauging elements connected with said blades and movable therewith, said gauging elements being disposed concentric to said axial line and in rear of the cutting blades for engagement with the stumps of the cut kernels, each gauging element being relatively long and thin and having blunt inner edges contacting with the cut kernels, the inner face of the advanced end of each gauging element being inclined gradually inwardly from the front end toward said axial line, said spring means being of relatively light tension whereby said gauging elements will ride up onto the stumps of the cut kernels and penetrate said stumps to a degree determined by the hardness thereof and thereby gauge the depth of cut.

2. A cutter head for corn comprising a stationary supporting head plate having an opening therethrough, a plurality of cutting blades independently mounted on said head plate and arranged about the opening and concentric to an axial line along which the axes of the ears are fed, spring means for moving the cutting blades inwardly, depth gauges mounted in advance of said cutting blades and connected to said cutting blades for initially positioning said blades as the ear enters the cutting head, and gauging elements connected with said blades and movable therewith, said gauging elements being disposed concentric to said axial line and in rear of the cutting blades for engagement with the stumps of the cut kernels, each gauging element being relatively long and thin and having blunt inner edges contacting with the cut kernels, the inner face of the advanced end of each gauging element being inclined gradually inwardly from the front end toward said axial line, said spring means being of relatively light tension whereby the gauging elements will ride up onto the stumps of the cut kernels and penetrate said stumps to a degree determined by the hardness thereof and thereafter gauge the depth of cut.

3. A cutter head for corn comprising a stationary supporting head plate having an opening therethrough, a plurality of lever arms pivotally mounted on said head plate, a cutting blade carried by each arm, said cutting plates being arranged about the opening and concentric to an axial line along which the axes of the ears are fed, a ring shiftably mounted on said head plate and connected to each lever arm for simultaneously shifting all of said arms, spring means connected to said ring and operating to shift the ring to move the cutting blades inwardly, gauging elements connected with said blades and movable therewith, said gauging elements being disposed concentric to said axial line and in rear of the cutting blades for engagement with the stumps of the cut kernels, each gauging element being relatively long and thin and having blunt inner edges contacting with the cut kernels, the inner face of the advanced end of each gauging element being inclined gradually inwardly from the front end toward said axial line, means whereby the tension of said spring means may be adjusted so that said gauging elements will ride up onto the stumps of the cut kernels and penetrate said stumps to a degree determined by the hardness thereof and thereby gauge the depth of cut.

4. A cutter head for corn comprising a stationary supporting head plate having an opening therethrough, a plurality of lever arms pivotally supported on said head plate adjacent said opening with the inner ends thereof shiftable toward and from an axial line along which the axes of the ears are fed, a cutting blade adjustably attached to each lever arm at the inner end thereof, spring means for moving the cutting blades inwardly, each lever arm having a lateral extension disposed in rear of the cutting blades in the direction of feed, the side edges of said extensions being substantially straight with the adjacent edges of adjacent extensions substantially parallel and closely spaced in all positions of the lever arms, said extension lying in a plane substantially parallel to the head plate and providing a closure for the region of the opening in the head plate outside of the cutting blades so as to prevent the kernel portions cut from the ear passing through the head plate.

5. A cutter head for corn comprising a stationary supporting head plate having a central opening therethrough, a plurality of lever arms pivotally attached to the front side of said plate adjacent said opening, a cutting blade associated with each arm and having a cutting edge extending spirally about the ear, said blade having a shank extending at an angle to said blade, bolts for securing the shank to the lever arm, said bolts being spaced from each other and passing through openings in the shank which are circular and of larger diameter than the bolts whereby said shank can be shifted to a limited extent in any direction in a plane at right angles to the pivotal axis of the lever arm for shifting the position of the free end and heel of the cutting blade relative to the center of the opening in said head plate for a given set position of the lever arm.

6. A cutter head for corn comprising a stationary supporting head plate having a central opening therethrough, a plurality of lever arms pivotally mounted on said head plate adjacent said opening, a cutting blade carried by each arm, a ring shiftably mounted on said head plate and connected to each lever arm for simultaneously shifting all of said arms, a lug carried by said ring, spring means connected to said ring and operating to shift said ring to move the cutting blades toward the center line of the head, a support movably mounted on said head plate from one set position to another, adjustable stops carried by said support and disposed so that when said support is in one set position, the lug will be in range of said stops and contact therewith for limiting the shiftable movement of the ring, said stops being out of range of said lug when shifted to the other set position so that the ring can be manually shifted and the cutting blades moved away from the center line of the opening to the limit of the opening.

RALPH COVER.